United States Patent
McCoy et al.

(10) Patent No.: US 9,870,058 B2
(45) Date of Patent: Jan. 16, 2018

(54) CONTROL OF A REAL WORLD OBJECT USER INTERFACE

(71) Applicants: Sony Corporation, Tokyo (JP); Sony Network Entertainment International LLC, Los Angeles, CA (US)

(72) Inventors: Charles McCoy, Coronado, CA (US); Leo Pedlow, Ramona, CA (US); True Xiong, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 107 days.

(21) Appl. No.: 14/259,520

(22) Filed: Apr. 23, 2014

(65) Prior Publication Data

US 2015/0309578 A1    Oct. 29, 2015

(51) Int. Cl.
| | | |
|---|---|---|
| *G06F 3/048* | (2013.01) | |
| *G06F 3/01* | (2006.01) | |
| *G06F 3/0484* | (2013.01) | |
| *G06K 9/00* | (2006.01) | |

(52) U.S. Cl.
CPC ............ *G06F 3/017* (2013.01); *G06F 3/0484* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 5,563,988 A | 10/1996 | Maes | |
| 8,073,198 B2* | 12/2011 | Marti | G06F 3/011 |
| | | | 345/156 |
| 8,599,132 B2* | 12/2013 | Chen | G06F 3/017 |
| | | | 345/158 |
| 9,098,871 B2 | 8/2015 | Argue | |
| 2010/0199232 A1* | 8/2010 | Mistry | G06F 1/163 |
| | | | 715/863 |

(Continued)

OTHER PUBLICATIONS

Mistry, "SixthSense", Published 2009, downloaded at http://www.pranavmistry.com/projects/sixthsense, 5 pages.

(Continued)

*Primary Examiner* — Hua Lu
(74) *Attorney, Agent, or Firm* — Mayer & Williams PC; Mark D. Wieczorek

(57) ABSTRACT

Systems and methods described allow users to select and obtain significant information about objects in the real world, and further to employ gestures as a "real world" interface to manipulate information and to manipulate the selection of objects. In this way, users may be enabled to make better decisions when, e.g., traveling and shopping, and may further be enabled to obtain significant information about objects with which they are surrounded. The systems and methods may include a camera which monitors a user's hand movements or gestures to control a UI, particularly where a user is interacting with real-world objects. Gestures can move the focus of a UI from one real world object to another. The systems and methods may also include a projector to illuminate selected objects, or to display information about objects.

9 Claims, 12 Drawing Sheets

(56) References Cited

U.S. PATENT DOCUMENTS

| | | |
|---|---|---|
| 2010/0253787 A1 | 10/2010 | Grant |
| 2010/0262554 A1* | 10/2010 | Elliott .................... G01C 21/20 705/323 |
| 2011/0221669 A1 | 9/2011 | Shams et al. |
| 2012/0278727 A1* | 11/2012 | Ananthakrishnan .. G06F 3/0486 715/748 |
| 2012/0302289 A1* | 11/2012 | Kang ...................... G06F 3/011 455/557 |
| 2013/0010068 A1* | 1/2013 | Tiernan .................. G06K 9/228 348/46 |
| 2013/0021374 A1 | 1/2013 | Miao et al. |
| 2013/0085345 A1* | 4/2013 | Geisner .................. G06Q 30/00 600/300 |
| 2013/0223673 A1* | 8/2013 | Davis ...................... G06K 9/78 382/100 |
| 2013/0283161 A1* | 10/2013 | Reimann ............... G06F 3/0486 715/716 |
| 2013/0321462 A1* | 12/2013 | Salter ...................... G06F 1/163 345/633 |
| 2014/0104163 A1* | 4/2014 | Ide ........................ G06F 3/0425 345/156 |
| 2014/0195374 A1 | 7/2014 | Bassemir |
| 2014/0201685 A1* | 7/2014 | Lim .................... G06F 3/04815 715/852 |
| 2014/0267012 A1* | 9/2014 | Mullins ................... G06F 3/013 345/156 |
| 2015/0009124 A1* | 1/2015 | Antoniac ........... G06K 9/00389 345/156 |
| 2015/0054982 A1* | 2/2015 | Ota .................... H04N 5/23229 348/231.6 |
| 2015/0268822 A1* | 9/2015 | Waggoner ........... G06F 3/04842 715/722 |

OTHER PUBLICATIONS

Harrison et al., "OmniTouch", published Oct. 18, 2011, downloaded at http://www.kurzweilainet/wearable-projection-system-turns-any-surface-into-a-multitouch . . . , 3 pages.

Mistry, "SixthSense", Published 2009, downloaded at http://www.pranavmistry.com/projects/sixthsense/ 5 pages.

Harrison et al., "OnnniTouch", published Oct. 18, 2011, downloaded at http://www.kurzweilai.net/wearable-projection-system-turns-any-surface-into-a-multitouch . . . , 3 pages.

Brothatech, "The 'Google Maps of Supermarkets' App AisleFinder is Now on Android", Jan. 6, 2012, pp. 1-2, accessed on Dec. 8, 2016, accessed at [http://appscout.pcmag.com/apple-ios-iphone-ipad-ipod/292460-the-google-maps-of-supermarketsapp-aislefinder-is-now-on-android].

\* cited by examiner

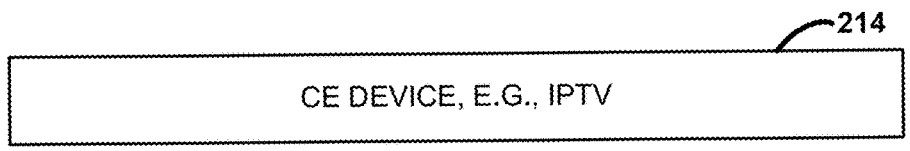
(A) 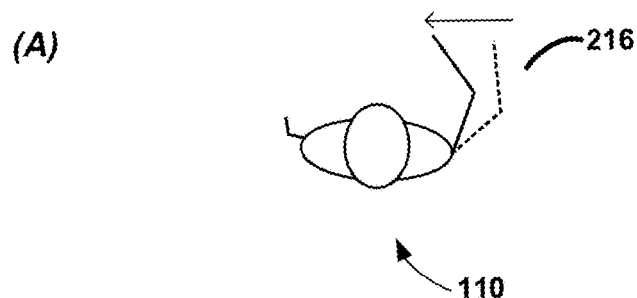
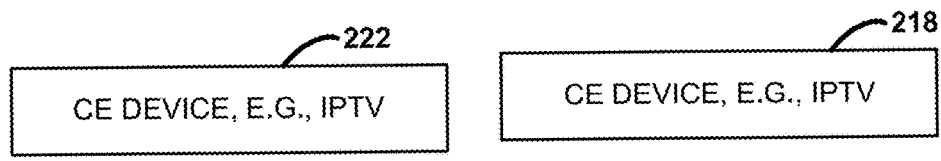
(B) 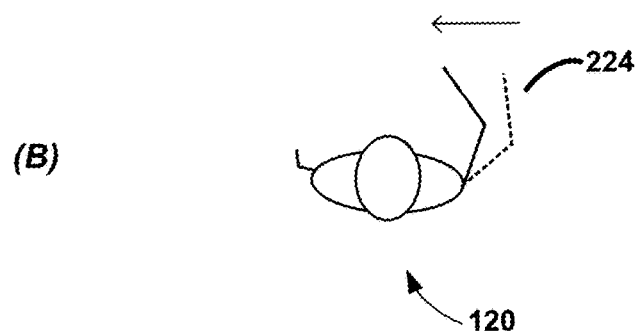
FIG. 8

CONTROL OF A REAL WORLD OBJECT USER INTERFACE

CROSS-REFERENCE TO RELATED APPLICATIONS (None.)

BACKGROUND

User interaction with virtual objects is ubiquitous in computing, and in particular in online environments. Such interactions include selecting objects as indicated on menus or in images, searching to discover additional details about the objects, retrieving additional images corresponding to the object, and the like. These interactions are generally facilitated by keyboard and mouse commands, pressing buttons generated on touchscreen displays, as well as in some cases by voice commands.

Certain efforts have been made at accomplishing interactions with computing devices at a more "real world" level. For example, in certain current eyewear, devices are provided in which a user may record video of a viewed scene using voice commands. It is also known to use body motions to control a UI, e.g., for a game, e.g., as supported by the Sony Move® system.

However, such devices still fail to provide a full-featured system. In particular, such devices are limited in their ability to provide users with information. These limitations are especially felt when a user is away from a laptop or other computing device with a substantial form factor, instead relying on a mobile device. Despite significant improvements in computing power with mobile devices, the same still have limited input and output capabilities.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles allow users to select and obtain significant information about objects in the real world, and further to employ gestures as a "real world" interface to manipulate information and to manipulate the selection of objects. In this way, users may be enabled to make better decisions when, e.g., traveling and shopping, and may further be enabled to obtain significant information about objects with which they are surrounded.

Systems and methods provide ways to use a camera, which may be headmounted or carried by the user, e.g., as part of a mobile device, and which monitors a user's hand movements or gestures, or other body movements, to control a UI, particularly where a user is interacting with real-world objects. Gestures can move the focus of a UI from one real world object to another. Gestures can manipulate the view of objects in various ways, e.g., adding or removing real-world objects from the set of objects that currently have focus in the UI. Pinching-type movements may also be supported according to implementation to allow sizing of a detection zone. Gestures may be supported which can reset the relationship between the highlight or target and the user's arms, which provides functionality similar to that of lifting a mouse to reset a relationship between the mouse location and a cursor location. Gestures can bring up a context-sensitive menu for actions related to a particular real-world object.

A selected object, focus, or target of the UI may be indicated in a number of ways, including by providing a highlight on the object itself using visible light, or providing a picture or other indication of the object on a display screen, e.g., within the headmounted or wearable display or on a user's mobile device, or by a combination of these.

The camera for supporting gesture control may be separate or may be part of, e.g., a mobile device.

Variations will be seen. For example, gestures may be employed to issue UI commands to consumer electronics ("CE") devices through a real-world object UI. Gestures may be employed for a number of other purposes, including in one particular implementation for synchronizing one display device with another, e.g., by "dragging" a game broadcast, playing on one TV, to another TV, to have the other TV start playing the game in a synchronized fashion.

In a first aspect, the invention is directed towards a method of selecting a physical object using a camera, including: receiving an image from a camera; analyzing the image to detect a physical object portrayed within the image; and causing light to be projected on the physical object.

Implementations of the invention may include one or more of the following. The method may further include causing an indicator of the physical object to be displayed on a user interface of a mobile device. The method may further include causing additional information about the physical object to be displayed on the user interface of the mobile device. The receiving and analyzing may be performed on a server, where the displaying is caused by transmitting data about the physical object from the server to the mobile device. The receiving and analyzing may be performed on the mobile device. The projected light may project data about the physical object.

In a second aspect, the invention is directed towards a method of selecting a physical object using a camera, including: receiving a first image from a camera; analyzing the first image to detect a gesture performed by a user, the gesture indicating a physical object, the physical object also portrayed within the first image; and causing the display of an indicator of the physical object, the display of an indicator further including: causing the display of an indicator of the physical object on a mobile device user interface, or causing light to be projected on the physical object.

Implementations of the invention may include one or more of the following. The causing the display of an indicator of the physical object may further include causing text or an image to be projected onto a surface, the text or image including data about the physical object. The method may further include transmitting the first image to a server, and the analyzing may be performed on the server. The analyzing may be at least partially performed on the mobile device, and the method may further include: displaying an indicator of the physical object if an identity of the physical object is available from the analysis on the mobile device; and if the analysis on the mobile device is insufficient to determine an identity of the physical object, then further including: transmitting the first image to a server for additional analysis; receiving a result of the additional analysis; and displaying data about the result on the mobile device. The receiving, analyzing, and displaying may be performed on the mobile device. The indicator may be data about the physical object. The method may further include activating a light source to cause light to be projected in a first direction on the physical object, and the activating a light source may include: activating a light source to project a second image, a portion of the second image in highlight, the highlight configured to be present on the physical object when the second image is projected; or activating a collimated light source, the collimated light source having a direction, the direction towards the physical object. The detected gesture may select the physical object. The detected gesture may also cause the light source to project light in a direction different from the first direction, such as onto a different physical object. The analyzing the image may further include analyzing objects within a detection zone defined within a field of view of the camera. The detected gesture may further cause the detection zone to change in size or position. The detected gesture may further cause the camera or the light source or both to reset to a respective default direction of the camera or the light source. The detected gesture may cause light projected on the physical object to remain stationary while the camera or the light source or both is moved, or the detected gesture may cause light projected on the physical object to remain stationary for duration of time, whereby a user may alter gesture or limb position without causing movement of the projected light. The indicator may be a menu for actions related to the physical object. Where the camera and light source are in a fixed positional relationship, the method may further include performing a step of calibration, the calibration including a first method and/or a second method. The first method may include: projecting a beam of light in a known direction from the light source; and detecting the location of the beam of light relative to an axis or plane of a lens of the camera. The second method may include: projecting an image including a target in a known direction from the light source; and detecting the location of the target relative to an axis or plane of a lens of the camera. The displaying may be performed on a headmounted display, e.g., including eyeglasses. The method may further include: detecting a SKU, barcode or product packaging to identify a physical object; transmitting the SKU, barcode or product packaging to a server; and receiving and displaying information about the physical object based on the transmitted SKU, barcode or product packaging.

In a third aspect, the invention is directed towards a non-transitory computer readable medium, including instructions for causing a computing device to perform the above method.

In a fourth aspect, the invention is directed towards a system for operating a gesture-based interface, including: an imaging module configured to receive an image of one or more objects and a user gesture; a video processing module configured to identify a gesture from the image; an item information coordinator module configured to identify an object in the image or to coordinate with a server through a network interface to identify an object in the image; a UI controller to adjust an operation of the imaging module based on the identified gesture; a user feedback module configured to provide data about an identified object, where the user feedback module provides the data in a way selected from the group consisting of: displaying the data on a mobile device screen, rendering an audio indicator of the data, or projecting the data on a surface; and a projector module, configured to cause light to be projected onto one or more objects imaged by the imaging module.

Implementations of the invention may include that the imaging module includes a camera, and where the imaging module is further configured to create the image of the one or more objects in the user gesture, or that the projector module includes a projector.

In a fifth aspect, the invention is directed towards a method of operating a gesture-based user interface, including: receiving an image from a camera; analyzing the received image to determine a user gesture; determining a control function to be entered to a computing device based at least in part on the user gesture; transmitting the control function to the computing device.

Implementations of the invention may include one or more of the following. The method may further include determining a computing device to control based on the user gesture, and the determining a control function to be entered to a computing device may include determining a control function to be entered to the computing device determined by the gesture. The analyzing may include discerning a user movement from the received image and comparing the discerned user movement to a plurality of basis user movements in a library to determine which of the plurality is intended to be a user gesture by the discerned user movement, or where the analyzing includes discerning a shape of a user movement from the received image and using the shape to determine the user gesture. The camera may be a video camera configured to be wearable by a user. The computing device may be a consumer electronics device, and the control function may at least partially in troll operation of the consumer electronics device. The analyzing may include determining a focus object. The determining may include detecting an object at or near a center of the image or detecting an object whose outline is entirely within a detection zone associated with the image, or may include detecting a physical object being selected by a user, where a physical object is being selected by a user when the determined user gesture indicates a control function is intended that is a selection function, and where the selection function indicates the physical object. The selection function may be configured to indicate a physical object when the user gesture is determined to be 'pointing at a physical object' and where the pointing is directed at the physical object. The method may further include activating a light source, the light source configured to project at least one content choice for potential playback on the consumer electronics device. The method may further include determining a selection of a projected content item based on a determined user gesture. The gesture may be a dragging gesture at least indicating a first content playback device and a second content playback device, and the control function may cause a content item, being played back on the first content playback device, to be played back on the second content playback device.

In a sixth aspect, the invention is directed towards a method of selecting a physical object using a camera, including: receiving a first image from a camera; detecting a gesture performed by a user, the detecting performed with a position or motion sensor; associating the detected gesture with a physical object, the physical object portrayed within the first image; and causing the display of an indicator of the physical object, the display of an indicator further including: causing the display of an indicator of the physical object on a mobile device user interface; causing light to be projected on the physical object; or causing text or an image to be projected onto a surface, the text or image including data about the physical object.

In a seventh aspect, the invention is directed towards a method of selecting a physical object using a camera, including: receiving a first image from a first camera; receiving a second image from a second camera and analyzing the second image to detect a gesture performed by a user; detecting a physical object in the first image; and causing the display of an indicator of the physical object, the display of an indicator further including: causing the display of an indicator of the physical object on a mobile device user interface; causing light to be projected on the physical object; or causing text or an image to be projected onto a surface, the text or image including data about the physical object.

In an implementation, the detecting a physical object in the first image may include associating the detected gesture from the second image with a physical object in the first image.

Advantages of certain implementations of the invention may include one or more of the following. Users may be enabled to access significant information about products, e.g., while shopping, such as reviews, warranties, nutritional information, and the like. In this way, rather than researching products at home and then entailing a separate step of traveling to purchase the product, users may be enabled to research products while they are shopping. Users may thus advantageously have a more active experience, and may be encouraged to "get out of the house" more. Systems and methods according to current principles enhance the experience of walking, biking, or traveling by any means, by providing information about items or objects viewed, and allowing functionality to manipulate an object of focus using user gestures.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 8(A) schematically illustrates gesture control of a CE device. FIG. 8(B) schematically illustrates gesture control between two consumer electronic devices.

Corresponding reference characters indicate corresponding parts throughout the drawings. Elements are not to scale unless otherwise stated.

DETAILED DESCRIPTION

Figure 1:
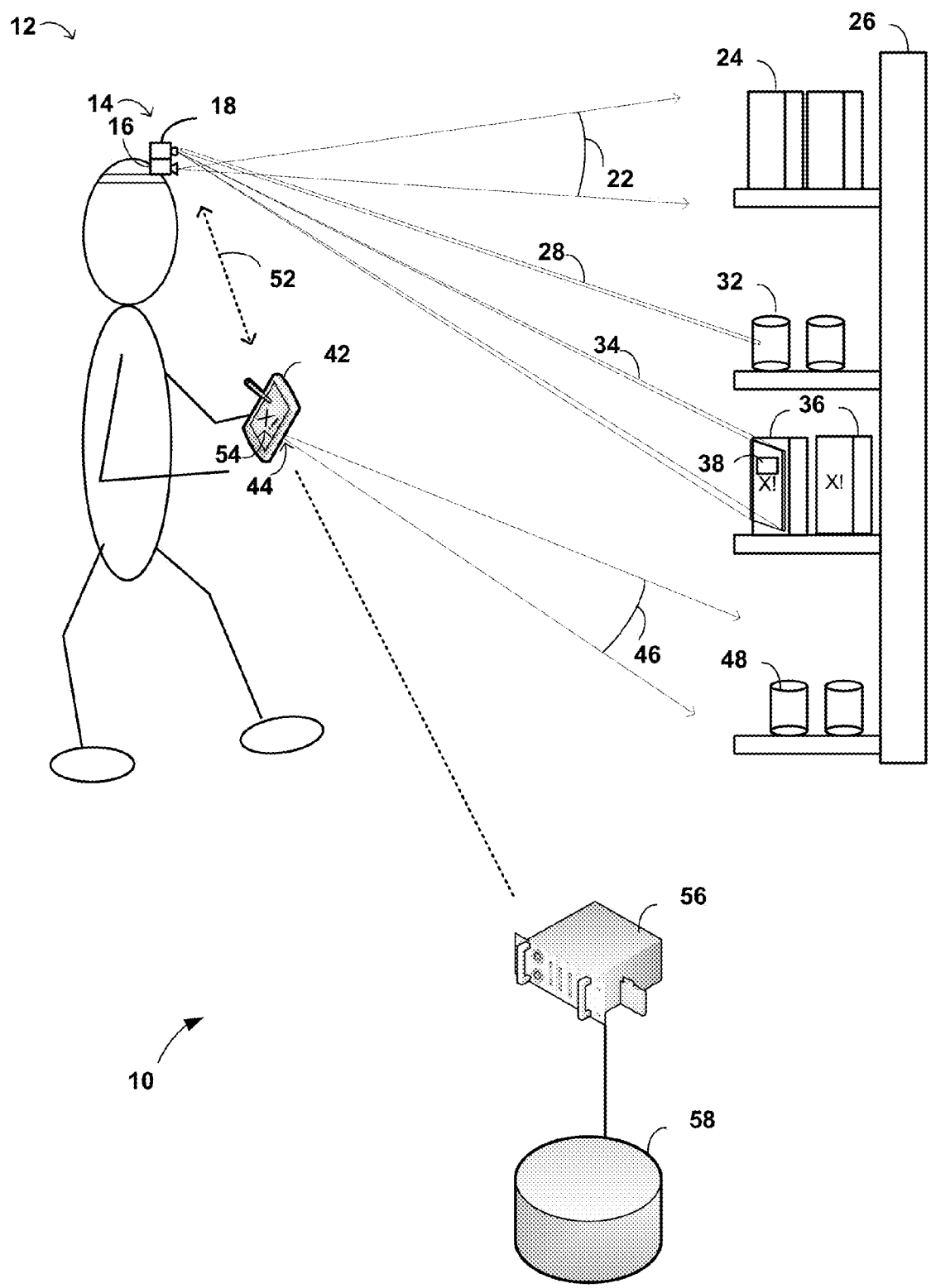
FIG. 1 is a schematic illustration of a user employing a system according to present principles to image, select, and highlight an object, as well as obtain additional information about the same.

Referring to FIG. 1, a system 10 according to present principles is illustrated in which a user 12 employs a camera and projection ("CAP") device 14, which in some implementations may be in data communication with a mobile device 42, to select and obtain information about real-world objects. In particular, real-world objects 24, 32, 36, and 48 are shown on shelves within a typical store rack 26, and are imaged by the CAP device 14 and in particular a camera 16 within the CAP device 14 which has a field of view indicated by the subtended solid angle 22. The camera 16 may attempt to analyze the entire image within its field of view 22, or a detection zone may be defined within the field of view as described below. Objects in the field of view or the detection zone may be analyzed against a database of objects to identify the objects and the identification used to enable the retrieval of additional information about the objects. For example, an item may be identified and a SKU or barcode discovered, which may then be used to search for additional information about the item. If information is available from the store itself in which the item is situated, even additional information may be obtained, calculated, or determined. For example, if the price can be determined, then a price per unit or other measure may be calculated and employed by the user for comparison shopping. Prices or other data may also be obtainable from online sources.

Besides the camera 16, the user 12 may have a mobile device 42 such as a smart phone, and a camera 44 associated with the smart phone 42 may be employed to image objects as well, either in lieu of or in addition to the camera 16. In FIG. 1, the camera 44 of the mobile device is shown having a field of view 46 and the same is imaging objects 48 on the bottom shelf of rack 26. One way of detecting objects is through detecting edges. Such detection may be performed visually, e.g., by detecting changes in color or hue, or may be performed from spatial information. Spatial information can be obtained by using multiple cameras to capture a 3-D view or may be determined from rangefinder sensors. In this latter case, edge detection may be performed by detecting when significant discontinuities exist in the distances of objects, indicating an edge has been reached.

The mobile device 42 may also be employed to display information about items selected, e.g., on a user interface 54. In cases where the CAP device 14 does not support mobile communications, mobile communications may be afforded by this capability on the mobile device 42. The CAP device 14 and the mobile device 42 may be in data communication via a connection 52, which may be Bluetooth®, infrared, or the like.

In order for the user to become aware of the object which is selected, an indicator of the selected item may be displayed on the user interface 54 of the mobile device 42, or via another display as described below, e.g., a wearable display. In lieu of such, or in addition thereto, a visible highlight may be provided on the object itself, such as by a wearable projector 18. The projector 18 may function in a number of ways. For example, a collimated beam 28 may be employed which shines on a selected object, the size of the collimated beam at the item generally smaller than most items. A broader or diverging beam 34 may also be provided, such as from an LCD or other video projector, but where the same has a target section 38 that appears different than the rest of the projected beam. For example, the target section may shimmer or move, and the shimmering or moving may be caused to appear on the selected, indicated, or focused object or item. To avoid ambiguity in object selection, the target section may also be generally smaller than the item or object. This beam is occasionally termed an "image" because the effect of the beam is to project an image on the object, and in particular an image with a target or highlight positioned on the selected object.

Whether collimated or diverging, to accomplish projection onto an item from a moving source (an ambulatory user), the projector is generally provided with a movable beam, the same being actuated by one or more small servomotors. The projector 18 is calibrated with respect to the camera 16, so that once an item is identified by the camera, the direction the projector must point to highlight the item is unambiguously identified. A direction, e.g., identified by angles in two different planes, may then be transmitted to the servomotors controlling the projector to allow the highlight to appear at the desired location. Again the highlight may be either a target in a diverging beam or the direction of a collimated beam.

Analysis of the received image may be in some cases performed on the mobile device 42 or even performed within the CAP device 14. Such analysis may then result in the determination of the identity of the selected item. However, in many cases, to obtain current information and data about items, as well as pricing information, data about the identified object or item may be sent to a server 56 in optional communication with a database 58. In many cases, the server 56 and/or the database 58 may also perform the analysis on the image to make an initial determination of the identity of the object or item selected, particularly in cases where the computing capacity of the mobile device is insufficient to make an unambiguous determination of the selected or focused item or object.

In these implementations, the image is received on the server, and the server performs the analyzing to determine the identity of the object or item. The identity of the object or item may be assisted by analysis of the visualized SKU, barcode, or other item identifier, and data about the identity may be transmitted from the server to the mobile device.

An indicator of the physical object may be displayed on a user interface 54 of the mobile device 42. Alternatively, the indicator may be projected by the projector 18 onto a surface viewable by the user 12 by the activation of the light source within the projector. The indicator generally provides information about the item, but may be simple or complex. In a simple embodiment, the indicator may show the name of the item. In a more complex embodiment, the indicator may provide the name, a description, and in some cases may further provide a menu by which a user may select additional functions. In particular, and referring to the system 80 of FIG. 2(A), a menu 124 may be projected which includes information about, in the case of a food item 118 on a shelf 122, ingredients 126, and other nutritional information.

Virtual buttons may also be provided to enable additional functionality. For example, a button 132 may allow a user to obtain additional information about the item 118, and a button 128 may allow a user to see alternative similar items. It will be understood that for nonfood items, a different set of data may be provided, and different virtual buttons. User selection of the virtual buttons 128 and 132 may be by way of gesture detection, as will be described below, but generally entails detection by the camera of the direction the user is gesturing.

Figure 2:
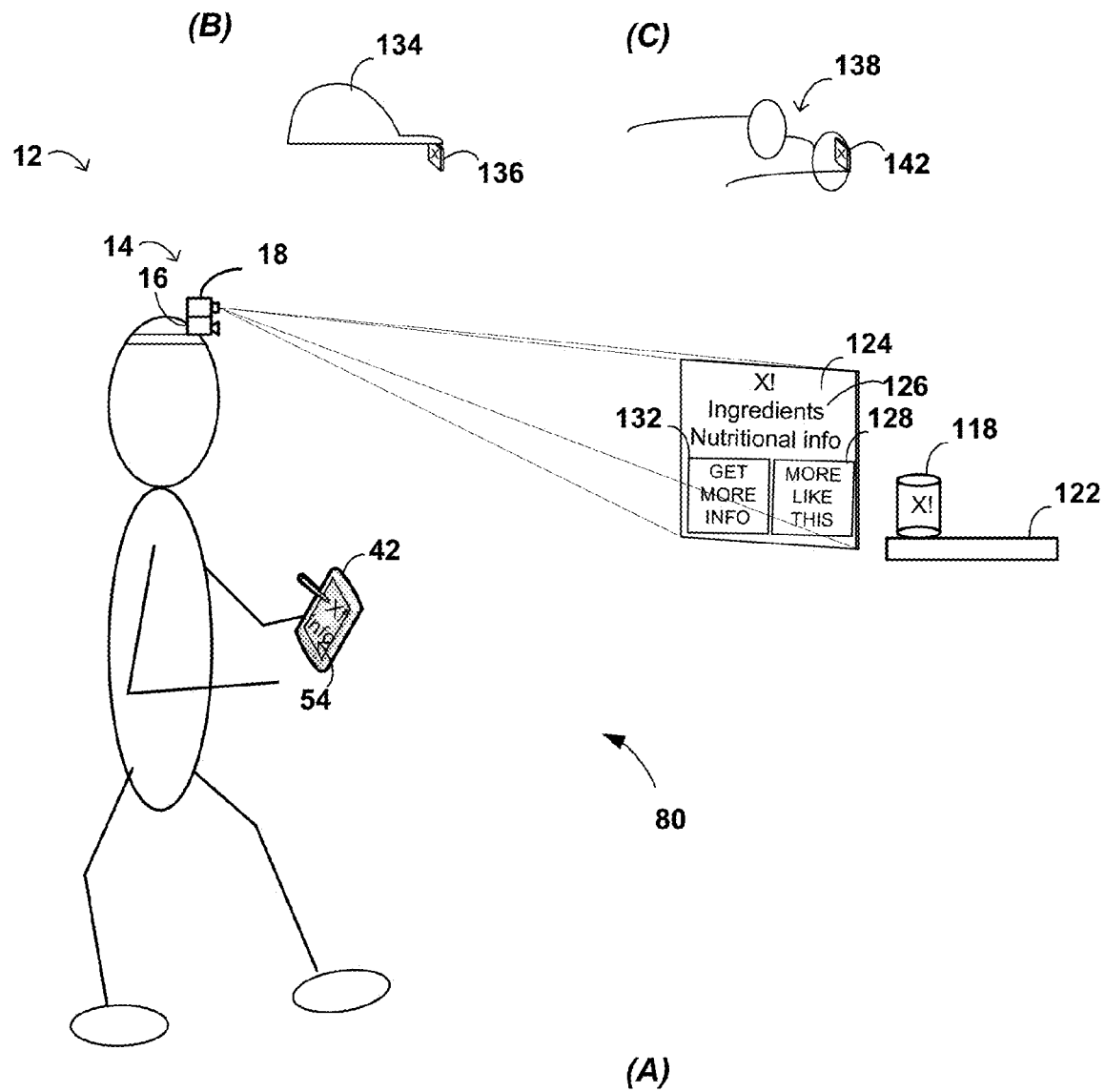
FIG. 2(A) is another schematic illustration of a user employing a system according to present principles to image, select, and highlight an object, as well as obtain additional information about the same.
FIGS. 2(B)-2(C) illustrate exemplary variations in how systems according to present principles may be implemented.

In lieu of a headband with device 14, the device 14 may be embodied by a drop-down device 136 from a hat 134 (FIG. 2(B)), or by a device 142 situated within eyewear 138 (FIG. 2(C)). Other variations will also be understood to one of ordinary skill in the art given this teaching.

In order to select a particular item, image analysis of a user gesture may be performed, and in many cases such will be video image analysis. For example, image analysis may be performed to determine an item at which a user is pointing, and such may be inferred by the system to be a selected item or object. In this example, the image analysis may follow the direction of a user's finger or hand, and may select the first item present. Variations will be understood, for example the first item present may be the first item which has its entire perimeter within the field of view, this requirement excluding other items on the side of the desired item to be selected, as well as excluding walls or rack or shelf components, and so on. Besides pointing at an object, it will be understood that a user may configure the system to provide other ways to select an object, as may be comfortable for that particular user.

As noted above, the selected item may be identified by a projected light on a surface, and may include an indicator of the item, such as its name, or even an image portrayed on a mobile device, which may be the image viewed by the camera or an image retrieved from a network source (having identified the selected object), or by other means, e.g., an audio recitation of the name of the product, e.g., in a headset such as a wired or Bluetooth headset, mobile device speaker, and so on. Audio feedback can be used in response to other conditions within the user interface as well, such as when focus is locked onto a particular object, or to indicate that the system has identified the focused object or that the system cannot identify the focused object.

Certain exemplary gestures are illustrated in FIGS. 3(A)-3(D). In the situation 70 of FIG. 3(A), by performing a pointing gesture 108 at an object 106, the object 106 is selected, and in the figure, a highlight 112 is then caused to be projected in a first direction onto the object 106. The highlight 112 may be caused to be projected by the activation of a light source within the projector. In this embodiment, an image of the object is also portrayed on a user interface 116 of a mobile device 114.

Figure 3:
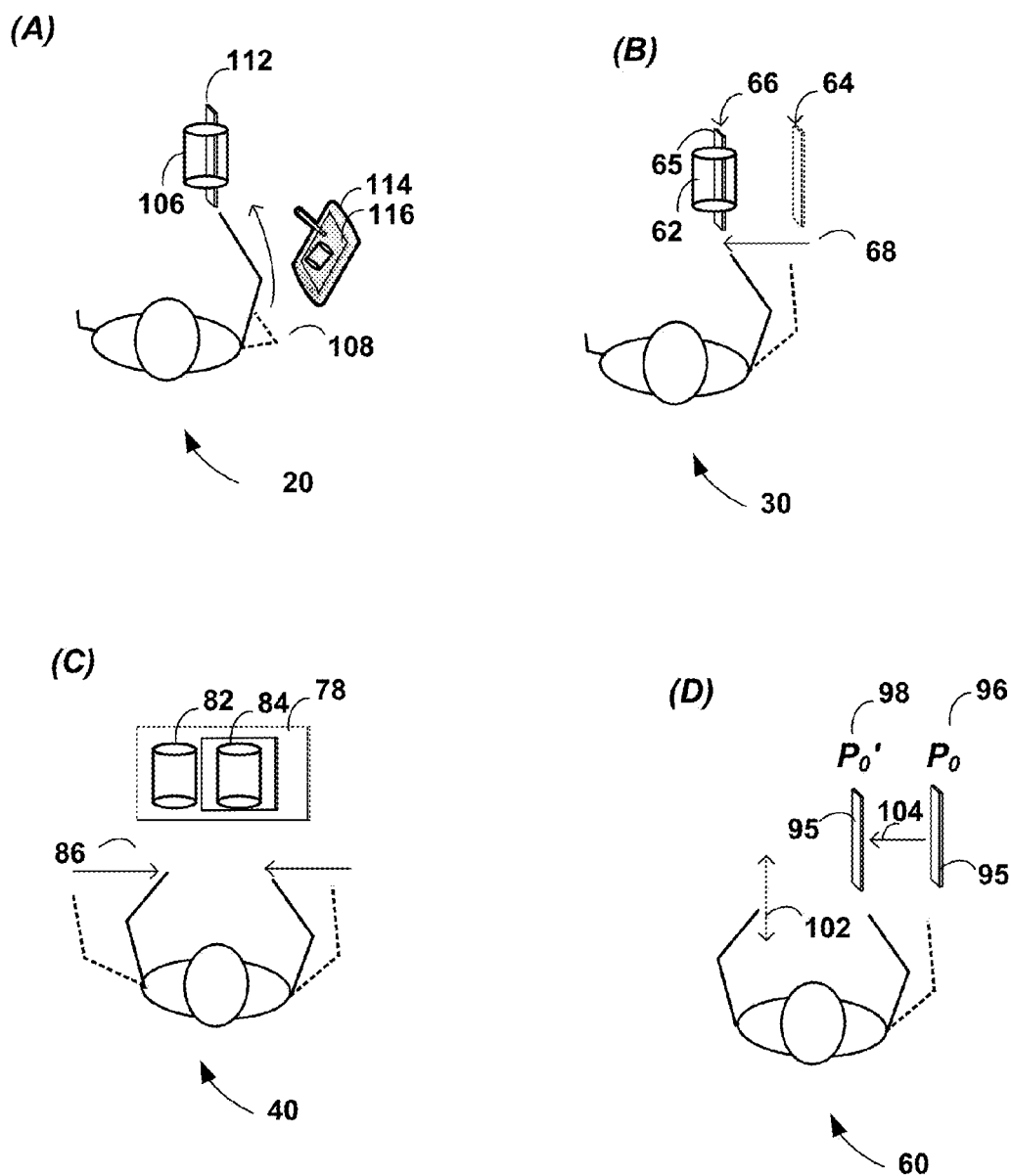
FIGS. 3(A)-3(D) are schematic illustrations showing exemplary types of gestures controlling a real world object user interface.

Next, in the situation 30 of FIG. 3(B), by performing a pointing gesture 68, the position of a highlight 65 is changed from a first position (or direction) 64 to a second position (or direction) 66, which thereby causes an item 62 to be highlighted. A selection gesture (which may be separated or combined with gesture 68) may then be employed to select the item 62. It will again be noted that besides changing the direction of a collimated beam, the steps may also be implemented by projecting a larger image, and moving the position of a highlight or target forming a portion of the image within the overall confines of the image. In the latter case the position of the overall image itself need not change, but the highlight is configured to be present on the physical object when the image is projected.

In a variation of this implementation, if a first object is selected, a gesture may cause the highlight to automatically move to an adjacent object, and in some cases to automatically select the same.

Referring to the situation 40 portrayed in FIG. 3(C), a detection zone 78 is illustrated which in some cases may be portrayed on a user interface viewable by the user. Where a detection zone is employed, the entirety of the field of view is not the subject of image analysis, but rather just a portion within the detection zone. By performing a pinching gesture 86, the size of the detection zone 78 may be changed and, in the figure, changing the size of the detection zone causes a single object 84 to be imaged rather than two objects 82 and 84. With an appropriate selection gesture, details about the object 84 may then be obtained and displayed. It will be understood that besides the size of the detection zone, the position of the detection zone may be adjusted by the user as well. In some implementations, once a single object is left in a detection zone, the system may automatically select the object. In enhanced implementations of this embodiment, the method may include detecting an object at or near a center of the image or detecting an object whose outline is entirely within the detection zone, and in this way determining the object to be selected. In a specific implementation, the computing capacity within the CAP device, and/or within the mobile device, may be employed to isolate an object in an image, but then the isolated object image may be sent to a server for actual identification of the imaged object.

Referring to the situation 60 of FIG. 3(D), a gesture 102 may also be defined, which causes a projected highlight 95 to reset from a first position ($P_o$) 96 to a new position ($P_o'$) 98. The new position $P_o'$ may generally be a default direction. This gesture provides functionality similar to that of raising a mouse from a mousepad in order to reset a position of a cursor. Similarly, a gesture may be provided whereby the position of the UI focus stays the same while the position or orientation of other aspects is changed, e.g., the position or orientation of the user, CAP, gesturing limbs, or the like. Ordinarily, without such a gesture, movement of these other aspects may cause the focus to change. Where the user performs such a gesture to allow repositioning of their limbs, the position of the UI focus, e.g., the projected beam, may stay the same for a predetermined duration of time, which time itself may vary based on the gesture.

Other user gestures will also be understood. In one implementation, the shape of a user gesture may be employed to determine certain actions. For example, instead of pointing at an object, an object imaged may be selected by the user tracing an "S" in the air around the object. The shape of the "S" is detected and OCR employed to discern the letter intended, and the discerned letter is then used to determine the action, e.g., via a look-up table.

Gestures may be employed to turn on or off the selection of an object. For example, a dim shimmering highlight may indicate a direction a beam is pointing at, similar to a mouse location. A brighter shimmering highlight may indicate that a particular item or object has been identified. A very bright shimmering highlight may indicate that a particular item or object has been selected. In lieu of increasing or decreasing brightness, different types of shimmering may be employed to indicate these distinctions, different shapes of highlights, and the like. In a particularly advanced implementation, the beam size may change (or size of the targeted portion within a divergent projected image) to encompass the entire perimeter or "seen" or "visible" area of a focused-on or selected item or object.

While certain ways to move a collimated beam (or target within a divergent image) have been described above, it will be understood that the same are only exemplary. A wide range of motions may be employed to support the movement of the highlight, e.g., arm motions indicating up/down/right/left movements, and the like. In all implementations, the user may move the beam manually, e.g., by moving his or her head in the case where the projector is headmounted. As noted elsewhere, such movement may also be compensated for in other implementations, whereby the user may move while the beam is stationary.

Figure 4:
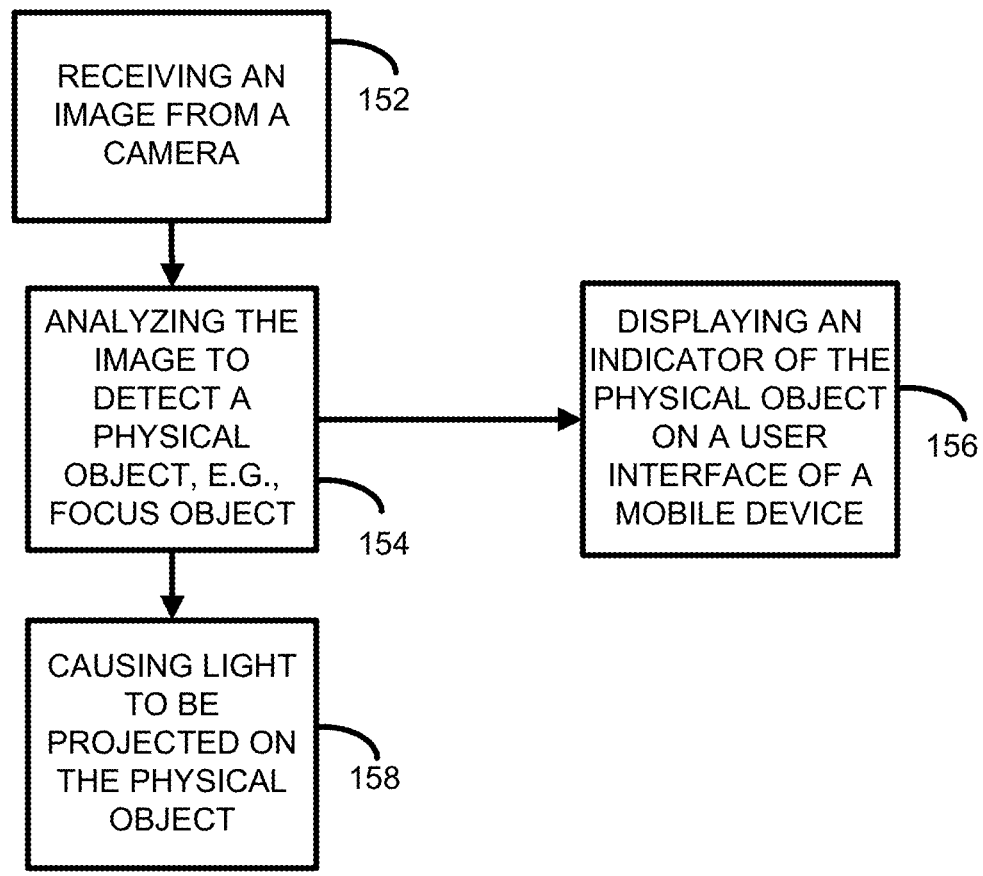
FIG. 4 is a flowchart of a method according to present principles.

FIG. 4 is a flowchart 140 detailing a method according to present principles. In a first step, an image is received from a camera (step 152). The camera may be a still camera but is generally a video camera such that the image changes as a user is walking or otherwise traversing through a store or other environment in which objects may be detected, imaged, analyzed, and highlighted.

The image is then analyzed to detect and identify a physical object (step 154). The analysis may take a number of forms, including detecting a barcode, SKU, or other objective identifier, and may also include detecting a shape or color of product packaging or labeling in order to perform the identification.

The object or item may then be highlighted (step 158). The highlighting may be as accomplished above. The highlighting may indicate just a direction of the projected beam, like a mouse cursor, or may also indicate that an object has been identified and/or selected. Use of a divergent beam with a target or highlight is analogous. An indicator of the physical object may also be displayed on a user interface of a mobile device (step 156).

Figure 5:
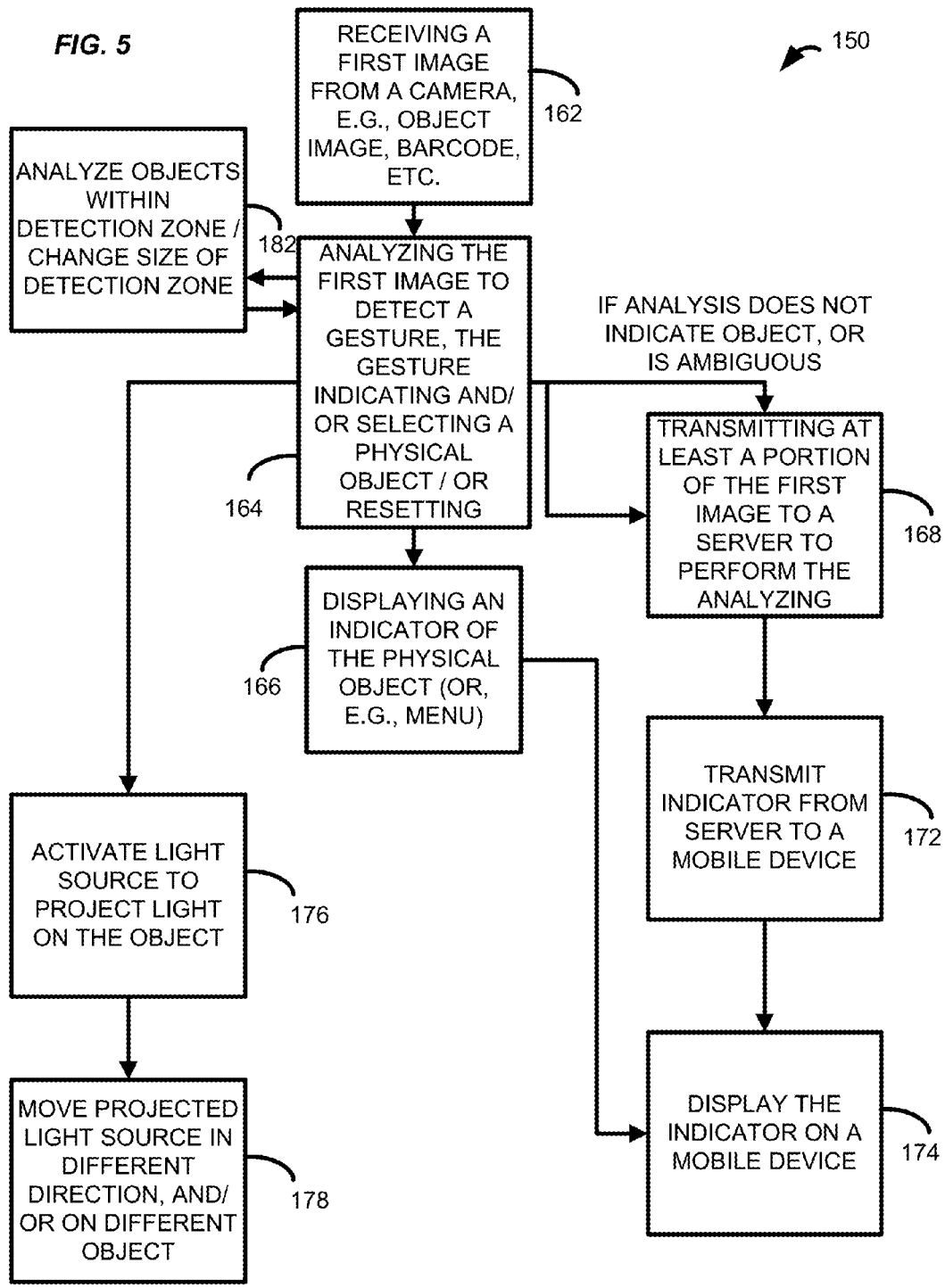
FIG. 5 is a flowchart of another method according to present principles.

The flowchart 150 of FIG. 5 shows a more detailed implementation of the method. In a first step, a first image is received from a camera (step 162). This step is analogous to step 152 of FIG. 4. The first image may then be analyzed to detect not just objects in the video stream but also a user gesture (step 164). The gesture may indicate a number of actions, including an object to be selected, a detection zone (for example a user may draw a rectangle in the air to indicate a desired detection zone which is then implemented in the camera and projection system), a resetting of a projected highlight to a default direction, and so on. An indicator may then be displayed of the physical object (step 166), such as via projection of information about the object or a context-sensitive menu on an adjacent surface or wall. This step may also include displaying an indicator on the mobile device (step 174). This step may also include projecting an indicator on the object itself, to indicate its selection.

Certain steps above are now described in more detail. The step 164 of analyzing may include analyzing objects within a detection zone (step 182), and/or changing the size of the detection zone to isolate one or more objects. In an example where multiple objects are targeted or within a detection zone, a user may define the detection zone such that several types of spaghetti sauce are within the zone, and the system may then perform a comparison of the varieties of spaghetti sauces, including nutritional information and/or pricing. The system may allow for defining several detection zones to accomplish the same purpose, e.g., a user may outline several different objects, or point to several different objects, to perform a comparison of the same.

The analysis step may be performed within the CAP device 14, although in many cases such may be more advantageously performed on the mobile device or on a server. Generally the greater computing capacity of the server allows for more rapid image analysis, as well as the rapid obtaining of information about the item (or items to be compared). The server may also access far more data about the object or comparative/competitive object data as compared to what could be stored locally on the mobile device. Consequently, if local analysis does not identify the object or is ambiguous, at least a portion of the first image (or the entire image) may be transmitted to a server to perform the analyzing (step 168). An identifier of the item may then be transmitted from the server to the mobile device (step 172), as well as any additional information about the item. Alternatively, once the identity of the item is known, the mobile device may search for additional information. An indicator of the item may then be displayed on the mobile device (step 174). The indicator may also be projected as described above.

To indicate a current focus of projection, or a selected object, the light source within the projector may be activated to project light onto the object, or to move the light onto the object (step 176), with displayed highlights as have been described. The light source may then be moved in a different direction, or onto a different object (step 178), as dictated by the needs of the user. As noted above, moving the light source may be performed by the user simply moving the projector "manually", by moving their body, or by the use of micro motors or other servomotors within the projector, in response to gestures by the user or commands within an application operating the projector.

As the projector is highlighting objects imaged by the camera, it is necessary that the projector be calibrated to the camera. In some cases, the camera and projector may be in a fixed positional relationship, and in this case the calibration may be required only occasionally, e.g., upon the mounting of one to another, if at all. In other cases, and particularly if the camera and projector are not in a fixed relationship, such as where a mobile device is employed as the camera (or even in some cases as the projector), then the step of calibration is particularly important and may be performed continuously or on a frequent basis, e.g., every second or few seconds (generally, as often as the positional relationship between the projector and camera changes). Where a mobile device has a projector functionality and both functions are performed by the mobile device, then the situation is as above with a fixed relationship.

Calibration steps generally include projecting a beam of light in a known direction from the light source, and then detecting the location of the beam of light using the camera. By detecting the location of the beam of light using the camera, the orientation of the projector can become known relative to an axis or plane of a lens of the camera. Where the projector projects a divergent image with a portion being a target, the camera can detect the location of the target. In this case, the camera can also in some implementations detect the extent of the projected image, thereby further improving the calibration.

Figure 6:
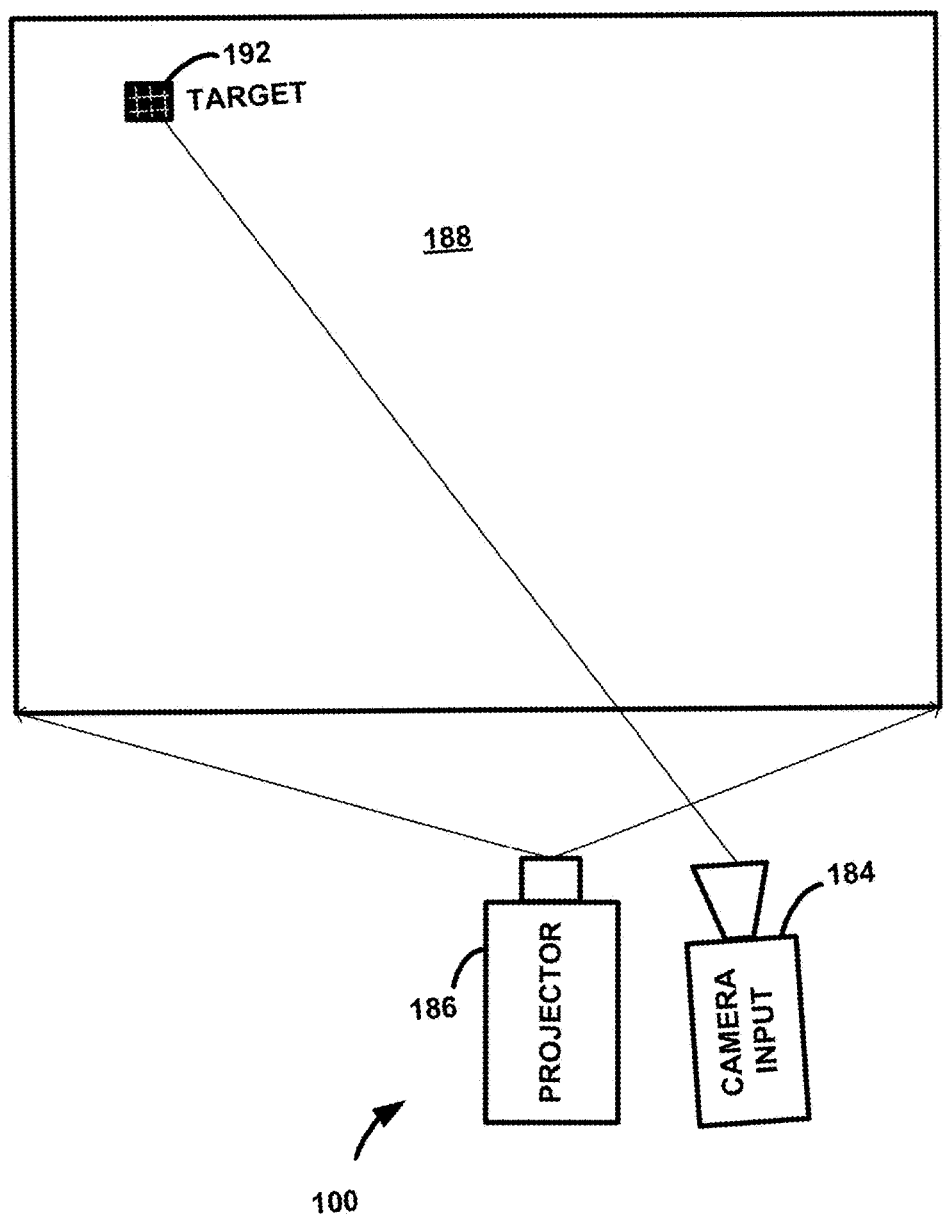
FIG. 6 shows an exemplary calibration technique which may be employed with systems and methods according to present principles.

Such a calibration is illustrated by the system 100 of FIG. 6. In this case, the CAP device includes a projector 186 and a camera 184. The projector is projecting an image 188 having a portion constituting a target 192. The camera 184 is shown detecting the target 192, and the position of the target 192 relative to the camera 184 can then be employed to determine the location of the projector 186 relative to the camera 184. A similar calibration will be understood for cases where a collimated beam is projected, rather than a divergent image.

Figure 7:
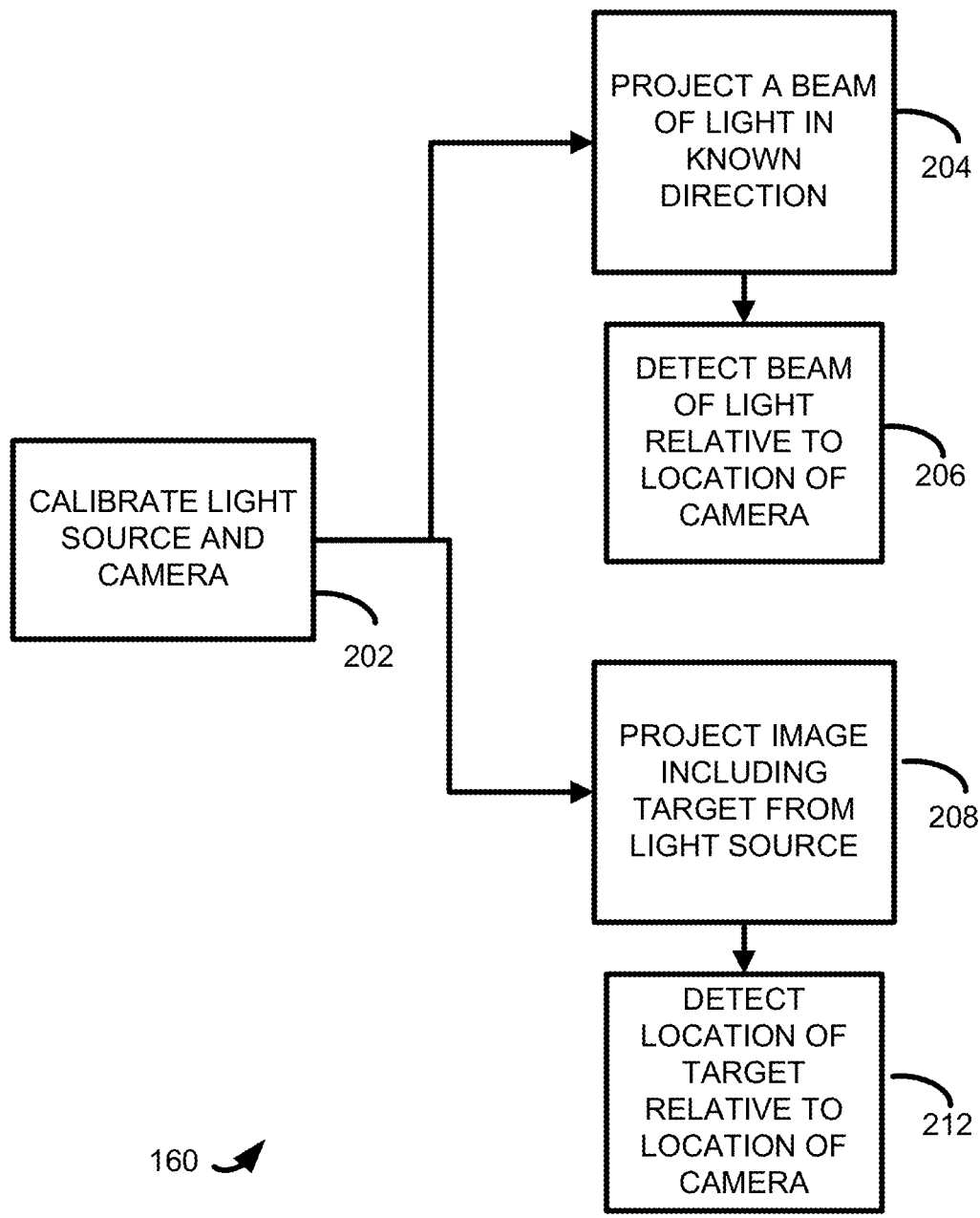
FIG. 7 is a flowchart of yet another method according to present principles, in particular showing a method for calibration.

FIG. 7 illustrates a flowchart 160 of a method of calibration. In a step of calibration (step 202), a collimated beam may be projected in a known direction (step 204), and the beam may then be detected relative to the location of the camera (step 206). In another implementation, an image is projected including a target from the light source (step 208), and the target location is detected by the camera (step 212), thus calibrating the position and orientation of the camera relative to that of the projector light source.

It will be understood in both situations that the camera is detecting the position of the beam or target on the object or item, and thus the distance of the item from the camera and the distance of the beam from the camera will be the same, and will thus scale up or down depending on the position of the user relative to the item or object. In other words, the calibration may not depend on the distance between the user and the item. This is particularly true when the camera is adjacent the projector. [

In other configurations, where there is a significant distance between the camera and the projector, the difference in angle to the same object between the camera and the projector can differ significantly based on how far away the object is. In such a situation, the camera image may require continuous monitoring to ensure that the projector is in the correct direction for the current distance to the object. Another option would be if the system included a way to measure distance, as noted above, e.g., multiple cameras to enable 3D reconstruction, range finders, or the like, then the offset can be calculated for the distance once the system is calibrated. If the camera and projector move relative to each other, then the system may generally constantly monitor the video to determine the alignment of the projected light with the real world and make corrections as that alignment drifts.

Referring to FIG. 8(A)-8(B), a gesture control according to present principles may also be employed to control one or more aspects of a CE or other computing device, by having user gestures translated into various control functions. In the situation 110 of FIG. 8(A), a CE device 214, e.g., an IPTV, is being controlled by a user who is performing a gesture 216. The gesture 216 may be any number of gestures, and may be translated to a respective number of control functions for a given CE device. For example, in many implementations, an initial gesture may be for selection or determination of a CE device for which controls are to be issued. Control functions may then be performed on the determined or selected device. For example, a user making an upward gesture may cause a "channel up" function to be performed. A user making a downward gesture may cause a "channel down" function. A user gesturing at their ear may cause the volume to rise. Other gestures will also be understood given this teaching. For example, gestures may be employed to select content. Gestures may further be employed to place content items on a wish list or playlist. It should be noted that such functionality described above is significantly greater than simply causing isolated acts based on movement, as the above includes, e.g., both device selection as well as device control. Relatedly, in one implementation the system detecting the user's gestures is separate from the device being controlled. In this way, commands are relayed to the device being controlled by the system that detects the user's gestures—the device being controlled is simply a passive recipient of commands. This may be contrasted with certain videogame consoles that include motion input. In such consoles, the game system is interpreting the user's gestures and responding to anything it can parse out as a command. It lacks an independent intermediary system between the user and the device being controlled. This feature also allows the independent intermediary gesture detection system to control multiple devices. In particular, some user gestures can be interpreted as commands to be routed to one device, while other user gestures can be interpreted as commands to be routed to a second device. Moreover, some gestures can be interpreted as commands to control the gesture UI itself. In this way, a degree of independence is provided between the gesture UI and the devices being controlled that is not present in game consoles.

Gestures may be employed to perform actions with respect to a number of CE devices as well, especially those connected on a network. For example, and referring to FIG. 8(B), a user making a swiping or dragging gesture from one CE device to another, e.g., a swiping gesture 224 from CE device 218 to CE device 222, may cause a content item which is playing back on the CE device 218 to also play back on the CE device 222, or to play back on the CE device 222 instead of playing on the CE device 218. The content item may be caused to play back in a synchronized fashion, e.g., starting at a point on one device where it left off on the other.

Whether the gesture is with respect to one device or many, the same may be discerned or identified by analysis of a visual image of the user gesture, e.g., from a camera. A user movement may be determined from the received image and the same compared to a plurality of basis user movements in a library or in a look up table to determine which of the plurality is intended by the user gesture. Once a basis user movement is found, the control function assigned to that user movement is then applied to the desired CE device.

It is noted in this regard that the device generating the image being displayed by a display device may not be the display device, such as when a TV displays the output of a cable box, disc player, game console, or computer. In such a case it may be more natural for the user to gesture towards the displayed image they wish to control, even though the location of the image source device that they are actually controlling may be somewhere else. In this case implementations of the disclosed systems and methods further perform a step of relaying the user's commands to the appropriate device, e.g., the cable box, disc player, game console, computer, or the like.

Figure 9:
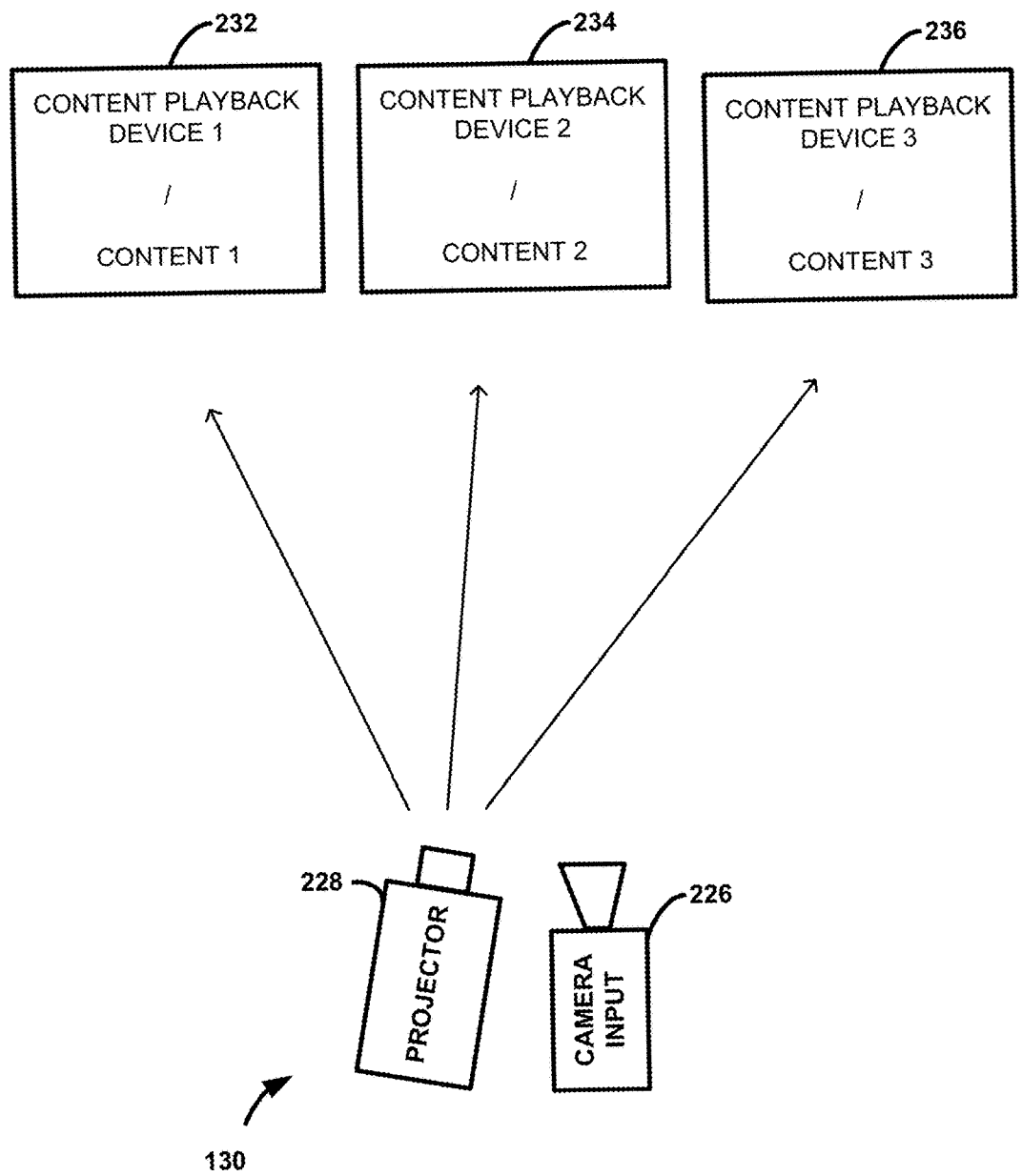
FIG. 9 schematically illustrates gesture control of CE devices, and in particular using gestures to select a CE device, or to select a content item, e.g., for playback.

In yet another implementation, as illustrated in FIG. 9, a CAP device 130 for controlling a CE device may include a projector 228 and a camera 226. The projector may be employed to display images pertaining to a number of content playback devices (illustrated in the figure by content playback devices 232, 234, and 236) which a user may gesture towards in order to select a particular content playback device for playback. The figure elements also illustrate that, if a device that can play content, e.g., radio or TV, is already in focus, then the images of content playback devices may be replaced by images pertaining to various portrayed content items which may also be the object of selection by the user. The same may show the title of the content item, or even a short trailer or stills from the same. A user gesture, e.g., pointing, can select the content playback device or content item by pointing at a given image, and having the camera detect the image which is being indicated by the user. Other alternatives for user selection will also be understood. For example, and as shown above in FIG. 8(B), a swiping gesture may cause an item of content to be synchronized between two devices.

It is noted that in a system in which multiple content playback devices are situated in a common area, e.g., within the same room, a user may gesture towards, i.e., point at, a physical content playback device and the camera may cause the selection of the same for playback. In either case, the image displayed by the projector 228 may be replaced by a menu system which would allow a user to browse and "drill down" to a desired content item for playback.

Figure 10:
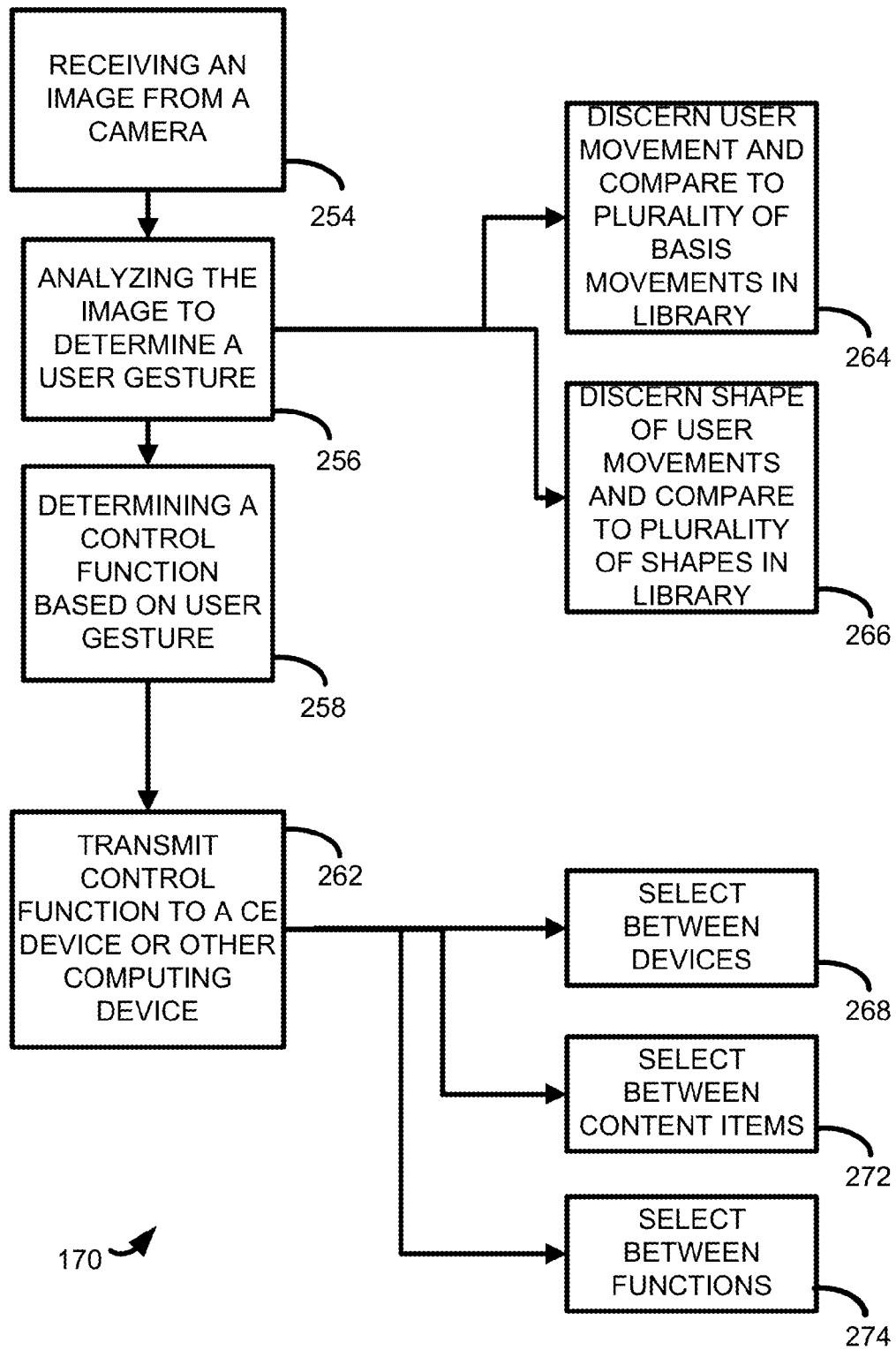
FIG. 10 is a flowchart of yet another method according to present principles, in particular showing a method for control of consumer electronic devices.

FIG. 10 shows a flowchart 170 for a method of gesture control of a CE device. In a first step, an image may be received from a camera (step 254). The image may then be analyzed to determine a user gesture (step 256). In so doing, a user movement may be discerned and compared to a plurality of basis movements in a library or lookup table (step 264). In another implementation, the user gesture may be determined by discerning the shape of a user movement and comparing the same to a plurality of shapes in a library (step 266). For example, if the user draws an "R" in the air, such may be discerned to be the letter "R".

A control function is then determined based on the user gesture (step 258). For example, where the user has drawn an "R" in the air, and the letter "R" has been discerned as the user gesture, a control function of, e.g., "RECORDING" may be determined. The control function is then transmitted to a CE device or other computing device (step 262). For example, the control function may cause one or more devices to be selected (step 268), a particular content item to be selected (step 272), and other functions may also be selected (step 274).

The way in which the control function is transmitted may vary, but the same may include IR remote control codes, Bluetooth®, network connections such as WiFi, LAN, or the same may be directly addressable in a proprietary manner. The same may also be addressable through a proxy, allowing a device that is not addressable from the network to be controlled.

Variations of the above CE device gesture control will also be understood. For example, while a camera has been described above for detecting gestures, gesture detection and/or determination may also be provided by other sensors, e.g., a virtual reality glove or headset, or motion or position sensors operated, controlled, or otherwise moved by the user, e.g., motion sensors disposed on a smart watch or ring worn by the user. Other such devices will also be understood given this teaching. In these cases, the sensor-detected-gesture is associated with an object visualized by the camera.

Figure 11:
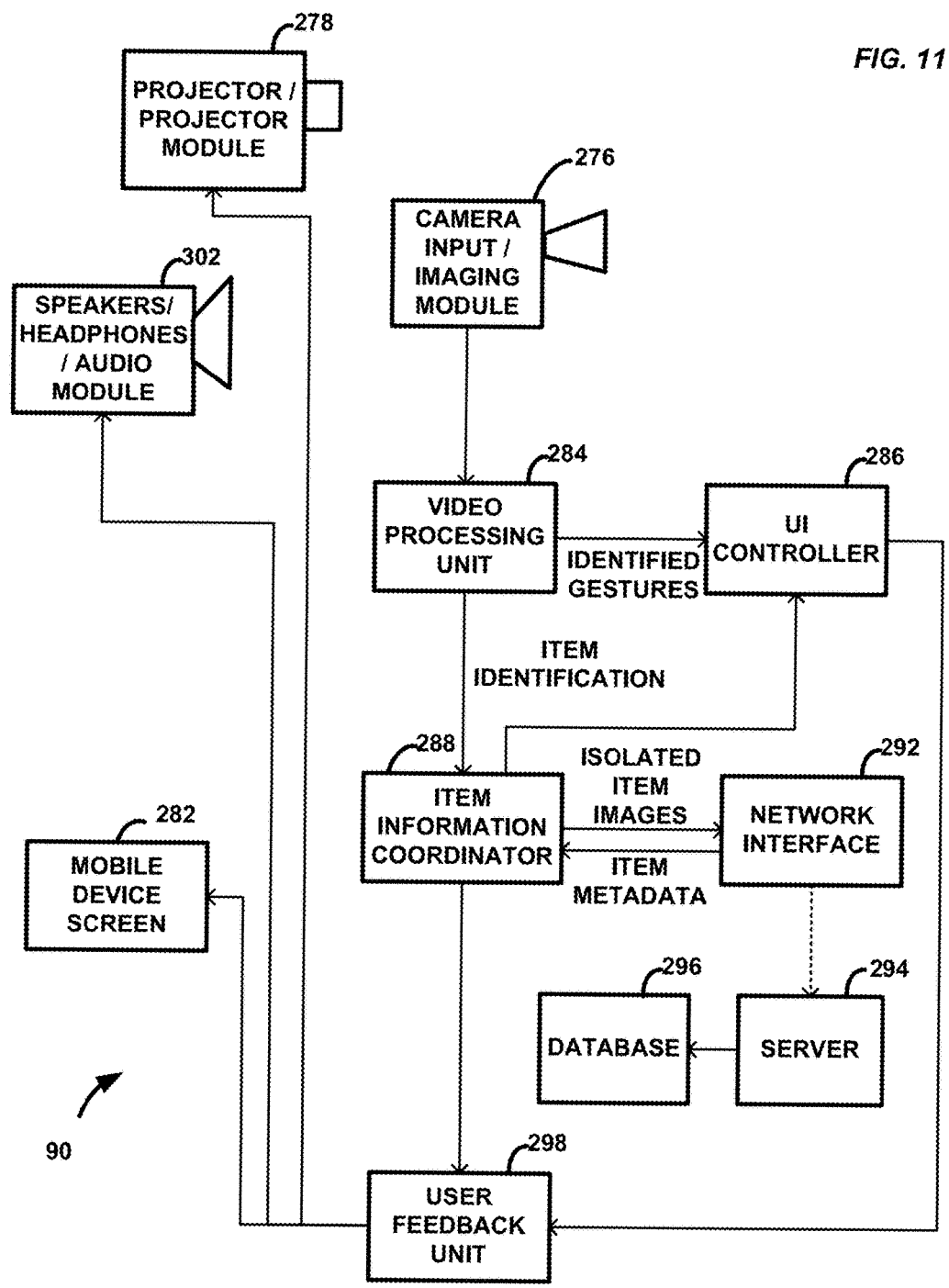
FIG. 11 is a logical diagram showing various elements in an exemplary system according to present principles.

FIG. 11 shows an exemplary system 90 according to present principles. Certain elements have been described above, including a projector 278, a camera 276, and a mobile device 282. Speakers or headphones 302 may also be employed to provide audio cues to a user, e.g., audio indicators of objects and items, or data and information pertaining thereto. The image from the camera 276 may be sent to a video processing unit 284 which may be employed to discern gestures and items. Aspects about gestures may be sent to a UI controller 286 which then functions as an input for a user feedback unit 298. Images and other aspects about particular items may be sent to an item information coordinator 288 which may itself identify items or may isolate item images and send the same through a network interface 292 to a server 294 which in turn may access a database 296. Retrieved item information, e.g., identification in the way of metadata, is then returned from the network interface 292 to the item information coordinator 288.

The user feedback unit 298 may in turn provide information about the item, e.g., indicators, to the projector 278 for projection on a surface, to the speakers or headphones 302 for playback to the user, or to a screen on the mobile device 282.

Additional variations and implementations are also possible, including combinations of the above features. The systems and techniques described above are not limited to the examples described. For example, while object highlighting has been described in the context of a projected light, a projected image with a target, or as displayed on the mobile device screen, the same may also be implemented within a headmounted displays, e.g., within eyewear, where the target is disposed on a screen viewable by the eyeglass wearer or as a target within a lens of the eye glasses. In this way, a viewer may be made aware of which object is selected by where the target appears on the lens of the eye glasses, e.g., generally in a direction marking the location of the selected object relative to the image viewed through the lens. The object may be indicated to be selected in other ways, e.g., by the name of the object being displayed on the eye glass screen or lens, or in other fashion. Other implementations of the system and method include configuration as part of a smart watch, cell phone, or the like.

Systems and methods according to present principles may be applied as an advanced "dash cam" or "helmet cam", allowing video to be taken of a user's surroundings but where the video is in some way selected by a user, using a combination of gestures and/or projections, so as to result in a recorded video with special emphasis on that which the user intends. Multiple cameras may be employed for this purpose, if the device supports such.

While a substantial portion of the disclosure is related to the experience of shopping, it will be understood that the system and method may apply to other applications as well. For example, while traveling, experiences may be enhanced by the systems and methods according to present principles. For example, a nature hike may be significantly enhanced by retrieving information about flora and fauna seen during the hike. Users may take advantage of the systems and methods according to present principles in the home, e.g., by controlling CE devices or preparing meals in a kitchen, or in the office, e.g., turning on projectors, transferring presentations or other images/videos from a laptop to the projector, causing documents to print or files to be transferred, turning lights on/off, and so on.

The systems and techniques may also be applied to viewing objects in other contexts, such as in online environments, social networking environments, and the like.

While the described systems have generally been with respect to systems employing visible light, the same may employ other wavelengths, especially in the case where the display is implemented within eyewear. In this case, the lenses of the eyewear may convert the reflected light into a form visible to the user. A benefit of this implementation is that other shoppers are not distracted by the projected light.

Certain systems and methods described above have employed activation of a light source as part of a step of projection. It will be understood that this phrase is used generally, and may also apply to situations where a light source is always on but is masked by darkened pixels. Modification of the pixels allows light to pass through, and such technology may advantageously be employed in the systems and methods described above.

In another variation, while the above description has concentrated on systems where a visual images of an object and a gesture are obtained using a single camera, multiple cameras may also be employed, e.g., where a first camera is used to obtain and transmit a first image including an image of a physical object, and a second camera is used to obtain and transmit a second image including an image of a user gesture.

Systems and methods according to present principles may advantageously employ aspects of machine learning to enhance and improve their operation over time. For example, if a common action for a user is to arrive home and to adjust their thermostat to 70°, the system may learn that such is a desired action, and may learn that if the user points at the thermostat when they arrive home, 70° would be a likely setting.

Other variations are also possible and will be readily apparent to those of skill in the art in light of this new disclosure.

One implementation includes one or more programmable processors and corresponding computer system components to store and execute computer instructions and data, such as to provide the structures, systems, and interfaces to provide the object identification, analysis, and indicator system. One such computing environment is disclosed below.

Figure 12:
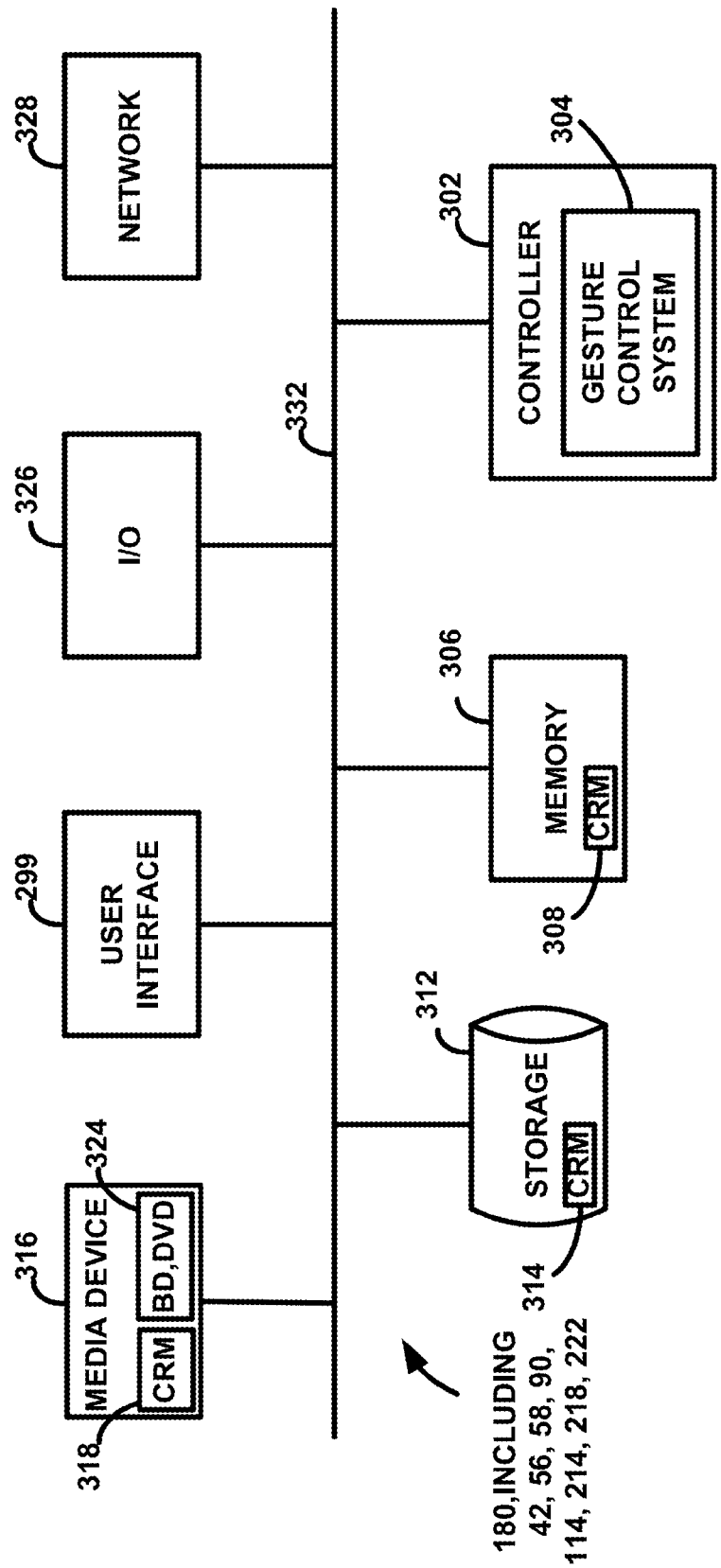
FIG. 12 is an exemplary computing environment in which the methods according to present principles may be implemented.

Referring to FIG. 12, a representation of an exemplary computing environment 100 in which the system and method may be implemented is illustrated.

The computing environment 180 includes a controller 302, a memory 306, storage 312, a media device 316, a user interface 299, an input/output (I/O) interface 326, and a network interface 328. The components are interconnected by a common bus 332. Alternatively, different connection configurations can be used, such as a star pattern with the controller at the center.

The controller 302 includes a programmable processor and controls the operation of a gesture control system 304. The controller 302 loads instructions from the memory 306 or an embedded controller memory (not shown) and executes these instructions to control the system.

Memory 306, which may include non-transitory computer-readable memory 308, stores data temporarily for use by the other components of the system. In one implementation, the memory 306 is implemented as DRAM. In other implementations, the memory 306 also includes long-term or permanent memory, such as flash memory and/or ROM.

Storage 312, which may include non-transitory computer-readable memory 314, stores data temporarily or long-term for use by other components of the system, such as for storing data or instructions. In one implementation, the storage 312 is a hard disc drive, a solid state drive, or cloud storage.

The media device 316, which may include non-transitory computer-readable memory 318, receives removable media and reads and/or writes data to the inserted media. In one implementation, the media device 316 is an optical disc drive or disc burner, e.g., a writable Blu-ray® disc drive 324.

The user interface 299 includes components for accepting user input, e.g., the user indication of gestures, objects, items or other aspects discussed above, and presenting a display, e.g., an indicator of an item or a menu for additional information, to the user. In one implementation, the user interface 299 includes the camera and projector noted above, as well as in some cases a keyboard, a mouse, audio speakers, and a display. The controller 302 uses inputs entered by the user to adjust the operation of the computing environment.

The I/O interface 326 includes one or more I/O ports to connect to corresponding I/O devices, such as external storage or supplemental devices, e.g., a printer or a PDA. In one implementation, the ports of the I/O interface 326 include ports such as: USB ports, PCMCIA ports, serial ports, and/or parallel ports. In another implementation, the I/O interface 326 includes a wireless interface for wireless communication with external devices, e.g., to a market or other Internet server or other source of information about indicated or selected products, items, or other objects. These I/O interfaces may be employed to connect to one or more content playback devices.

The network interface 328 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method of operating a gesture-based user interface, comprising:
   a. receiving an image from a camera on a gesture control device;
   b. analyzing the received image to determine a user gesture on the gesture control device, the analyzing further determining a focus object;
   c. on the gesture control device, determining a control function to be entered to a separate computing device based at least in part on the user gesture, wherein the determining a focus object includes detecting a physical object being selected by a user, wherein a physical object is being selected by a user when the determined user gesture indicates a selection function and wherein the selection function indicates the physical object, and assigning the selected physical object as the focus object;
   d. transmitting the control function from the gesture control device to the separate computing device.

2. The method of claim 1, further comprising determining a computing device to control based on the user gesture, and wherein the determining a control function to be entered to a separate computing device includes determining a control function to be entered to the separate computing device determined by the gesture.

3. The method of claim 1, wherein the analyzing includes discerning a user movement from the received image and comparing the discerned user movement to a plurality of basis user movements in a library to determine which of the plurality is intended to be a user gesture by the discerned user movement, or wherein the analyzing includes discerning a shape of a user movement from the received image and using the shape to determine the user gesture.

4. The method of claim 1, wherein the camera is a video camera configured to be wearable by a user.

5. The method of claim 4, wherein the separate computing device is a consumer electronics device, and wherein the control function at least partially controls operation of the consumer electronics device.

6. The method of claim 5, further comprising activating a light source, the light source configured to project at least one content choice for potential playback on the consumer electronics device.

7. The method of claim 6, further comprising determining a selection of a projected content item based on a determined user gesture.

8. The method of claim 5, wherein the gesture is a dragging gesture at least indicating a first content playback device and a second content playback device, and wherein the control function causes a content item, being played back on the first content playback device, to be played back on the second content playback device.

9. The method of claim 1, wherein the determining a focus object further includes detecting an object at or near a center of the image or detecting an object whose outline is entirely within a detection zone associated with the image, and assigning the same as the focus object.

* * * * *